(12) United States Patent
Cai et al.

(10) Patent No.: US 10,554,277 B2
(45) Date of Patent: Feb. 4, 2020

(54) ACCESS NODE, USER NODE AND METHOD FOR DETERMINING AT LEAST ONE BEAMFORMING PARAMETER

(71) Applicant: Huawei Technologies Co., Ltd., Shenzhen (CN)

(72) Inventors: Tao Cai, Kista (SE); Kari Juhani Leppanen, Helsinki (FI); Kari Heiska, Helsinki (FI); Pauli Seppinen, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/725,046

(22) Filed: Oct. 4, 2017

(65) Prior Publication Data

US 2018/0048370 A1 Feb. 15, 2018

Related U.S. Application Data

(63) Continuation of application No. PCT/EP2015/068761, filed on Aug. 14, 2015.

(51) Int. Cl.
*H04B 7/06* (2006.01)
*H04B 17/309* (2015.01)
(Continued)

(52) U.S. Cl.
CPC ......... *H04B 7/0617* (2013.01); *H04B 7/0408* (2013.01); *H04B 17/309* (2015.01);
(Continued)

(58) Field of Classification Search
CPC .. H04B 7/0617; H04B 17/309; H04B 7/0408; H04B 7/0639; H04B 7/063; H04W 72/046; H04W 48/17; H04L 25/0202
See application file for complete search history.

(56) References Cited

U.S. PATENT DOCUMENTS

2005/0037799 A1* 2/2005 Braun ................... H04W 16/28
455/525
2007/0268986 A1* 11/2007 Morita ................ H04L 27/2613
375/295

(Continued)

FOREIGN PATENT DOCUMENTS

CN 102164374 A 8/2011
CN 103222296 A 7/2013
EP 2897304 A1 7/2015

*Primary Examiner* — Feben Haile
(74) *Attorney, Agent, or Firm* — Leydig, Voit & Mayer, Ltd.

(57) ABSTRACT

The present disclosure provides an access node configured for determining at least one beamforming parameter for communication between the access node and a user node. The access node including: a first-band receiver configured to receive at least one first signal from said user node on a first frequency band; a processor and a non-transitory computer-readable medium including computer-executable instructions executed by the processor to perform, on the access node, determining at least one first beamforming parameter based on said received first signal; and a second-band transmitter configured to send, with a transmit beam that is configured based on said determined first beamforming parameter, on a second frequency band at least one second signal to said user node. The first frequency band includes lower frequencies than the second frequency band.

12 Claims, 7 Drawing Sheets

(51) Int. Cl.
  *H04B 7/0408* (2017.01)
  *H04L 25/02* (2006.01)
  *H04W 48/00* (2009.01)
  *H04W 72/04* (2009.01)

(52) U.S. Cl.
  CPC ......... *H04L 25/0202* (2013.01); *H04W 48/17* (2013.01); *H04W 72/046* (2013.01); *H04B 7/063* (2013.01); *H04B 7/0639* (2013.01)

(56) References Cited

U.S. PATENT DOCUMENTS

| | | | |
|---|---|---|---|
| 2011/0076955 A1* | 3/2011 | Uno | H04W 16/28 455/63.4 |
| 2013/0243110 A1 | 9/2013 | Skov et al. | |
| 2014/0073337 A1 | 3/2014 | Hong et al. | |
| 2014/0098912 A1 | 4/2014 | Yin et al. | |
| 2014/0148107 A1* | 5/2014 | Maltsev | H04B 1/02 455/91 |
| 2015/0116154 A1* | 4/2015 | Artemenko | H01Q 15/08 342/371 |
| 2015/0173004 A1 | 6/2015 | Nigam et al. | |
| 2016/0381685 A1* | 12/2016 | Kasher | H04L 27/2657 370/329 |

* cited by examiner

ACCESS NODE, USER NODE AND METHOD FOR DETERMINING AT LEAST ONE BEAMFORMING PARAMETER

CROSS-REFERENCE TO RELATED APPLICATIONS

This application is a continuation of International Application No. PCT/EP2015/068761, filed on Aug. 14, 2015, the disclosure of which is hereby incorporated by reference in its entirety.

TECHNICAL FIELD

The present disclosure relates to an access node that is configured for determining at least one beamforming parameter. The present disclosure also relates to a user node for operating with one or more of the access nodes. The present disclosure also relates to a method for determining at least one beamforming parameter for communication between an access node and a user node. The present disclosure also relates to a system comprising an access node and a user node.

The present disclosure further also relates to a computer-readable storage medium storing program code, the program code comprising instructions for carrying out a method for determining a beamforming parameter.

BACKGROUND

In the context of next generation wireless networks, with a targeted commercialization time around 2020, both millimeter wave radio and centimeter wave radio are considered to be used for the purpose of establishing access links between the access node (or access point, or base station, or Node B or eNode B/eNB) and the user node (or user equipment/UE, or mobile terminal, or mobile device) within a wireless access network.

There are two special aspects of millimeter wave radio from the perspective of its antenna design. One is that the millimeter wave radio will require less power, due to higher frequency, higher noise power and due to normally wider millimeter wave radio channel bandwidth. On the other hand, millimeter wave radio suffers from lower signal-to-noise ratio. However it can be compensated by higher antenna gains with higher antenna directionality. Because of its smaller wavelength, the antenna size is smaller for millimeter wave radio. The transmitter and receiver of millimeter radio can accommodate more antenna elements hence narrower beams can be produced with large number of antenna elements which will yield higher antenna gains. The beam can be formed through a phase control system such that the direction, as well as the beam width can be adjusted. Narrower beam is beneficial for the purpose of providing higher antenna gains, causing less multi-path fading as well as minimizing cross link interference.

The large available bandwidth and the high gain narrow antenna beam make the millimeter wave link very suitable for providing very high data throughput between the access node and the user node. However, it is difficult to establish and maintain such link between the access node and the user node via narrow beam since the user node is constantly moving and turning. The localization of the user node as well as the determination of the optimal antenna beam direction for both the access node and the user node can benefit from the usage of combined millimeter wave link and centimeter wave link.

US 2014/098912 A1 discloses that initially, the mobile station detects the strongest beam direction for a wide beam for communicating with a base station. Then the mobile station sends a transmitter slice/ID to the base station in the uplink identifying the wide beam slice. The mobile station then switches to narrow beam mode to scan a set of narrower beams within that selected slice and detect the strongest beam direction for a narrow beam. The mobile then sends a slice/ID to the base station in the uplink identifying the narrow beam slice. The mobile station then receives data that is transmitted on the paired narrow beams.

However, the above mentioned method requires a high signaling effort between the mobile station and the base station, which increases latencies of the beam search.

SUMMARY OF THE INVENTION

Embodiments of the disclosure provide an access node, a user node, a system and a method for determining at least one beamforming parameter, wherein the access node, the user node, the system and/or the method overcome one or more of the above-mentioned problems of the prior art.

A first aspect of the disclosure provides an access node configured for determining at least one beamforming parameter for communication between the access node and a user node, the access node comprising
 a first-band receiver for receiving at least one first signal from the user node on a first frequency band;
 a determination module for determining at least one first beamforming parameter based on the received first signal; and
 a second-band transmitter for sending, with a transmit beam that is configured based on the determined first beamforming parameter, on a second frequency band at least one second signal to the user node;
wherein the first frequency band comprises lower frequencies than the second frequency band.

The access node of the first aspect uses two different frequency bands, wherein the first frequency band comprises lower frequencies than the second frequency band. This is advantageous because the different frequency bands can involve different propagation properties and/or different power consumption. Thus, the advantages of different frequency bands can be combined.

One embodiment of the disclosure is that the first frequency band comprises lower frequencies than the second frequency band, wherein the first and second frequency band are non-overlapping, i.e. the first frequency band is located below the second frequency band. However, the method can also be implemented such that the first frequency band and the second frequency band also comprise same frequencies, i.e. the first and second frequency band are partially overlapping with the first frequency band being only partially below the second frequency band. In alternative embodiments, the first and second frequency bands can be identical: The user node can use a wider beam to send the first signal to the access node; the access node, after determining the first beam-forming parameter, can use a narrower beam to send the second single to the user node.

In embodiments of the invention, the beamforming parameters are related to a localization of the user node. Thus, the access node according to the first aspect can be used for performing a method for localizing a user node. In other embodiments the beamforming parameters are not directly related to a location of the user node. For example, beamforming parameters could be related to a width or other parameter of a transmit or receive beam.

By using localization on two frequency bands, the time needed to achieve accurate positioning of the user node can be minimized. The positioning results can be used to optimize the localization algorithm and models. The timing of the user node to open a second-band receiver can be controlled by the access node hence the energy consumed can also be optimized. Also, the positioning with the first frequency band can done by the user node sending a low power beacon on the first frequency band.

It should be noted that in general the disclosure is not limited to certain first and second frequency bands. The disclosure can be used in general with a combination of first and second frequency bands, where preferably the first and second frequency band have different propagation properties (e.g. for performing a coarse and a fine localization of a user node) or wherein the first and second frequency band involve different power consumption for a transmitter.

Both the first and the second beamforming parameter can be related to transmit beams of the access node and/or receive beams of the user node.

In a first implementation of the access node according to the first aspect, the first frequency band is in a centimeter wavelength range and the second frequency band is in a millimeter wavelength range.

Millimeter wave is the radio wave with wavelength between 1 mm and 10 mm. The frequency of millimeter wave is from 30 GHz to 300 GHz. Correspondingly centimeter wave is the radio wave with wavelength between 1 cm and 10 cm and frequency between 3 GHz to 30 GHz. Working on millimeter wave, it is easier for the transmitter and receiver to form narrower antenna beams. On the other hand, with centimeter wave, a non-line-of-sight (NLoS) radio link is easier to be established between the transmitter and the receiver. Millimeter wave link can be blocked by an obstacle; hence a millimeter wave link is usually used for line-of-sight (LoS) scenarios. Thus, the method of the first implementation advantageously combines the advantages of different frequency bands.

Centimeter wave link can have relatively wider antenna beam width and can be used to provide coarse localization of the user node before the more accurate localization done with the millimeter wave link. The centimeter wave link can also be used to transmit control message and signalling between the access node and the user node.

The localization can be done constantly with the C-band link. As the C-band link can work in NLoS, and the shadowing effects are much less severe than in mmW-band, it is assumed that the user node can always be reached and localized. The localization accuracy depends on the positioning models that are used in the localization algorithm.

The first frequency band is preferably located in the centimeter wavelength range, and the second frequency band is preferably located in the millimeter wavelength range. In particular, in further embodiments of the invention, the first frequency band comprises frequencies from 3 GHz to a predetermined cutoff frequency and the second frequency band comprises frequencies from the predetermined cutoff frequency to 300 GHz wherein the cutoff frequency is between 10 GHz and 50 GHz, preferably between 20 GHz and 35 GHz.

According to the first implementation, the access node can use a combination of C-band (Centimeter wave spectrum band) link and mmW-band (Millimeter wave spectrum band) link in the localization of user node, before data transmission is done with mmW band. The localization with C-band and mmW-band can be done in parallel manner, as well as in sequential manner. In embodiments of the invention, the access node can rely on localizing with C-band link as much as possible to shorten the overall localization time.

According to the first implementation, it is avoided that the user node needs to receive the training signals on a narrow beam regularly for tracking. As the user node antennas are quite directive when using mm-wave bands, there needs to be many antenna branches activated every time. All in all this leads to unnecessary power consumption, which can be avoided according to the first implementation.

In a second implementation of the access node according to the first aspect, the at least one second signal comprises a plurality of training signals and the access node comprises a first-band transmitter for sending on the first frequency band an information about the plurality of training signals to the user node.

The training signals can comprise a predetermined sequence of symbols, the training signals can be also predetermined training sequence, or pilot sequence.

This has the advantage that, since the user node first receives an information about the training signals on the first frequency band, it can compare the training signals that it subsequently receives on the second frequency band with the information about the training signals. Thus, the quality of link on the second frequency band, e.g. corresponding to different receive and/or transmit antenna beams, can be compared.

In a third implementation of the access node according to the first aspect, the information about the plurality of training signals includes at least one of the plurality of training signals, a timing of the plurality of training signals, a transmit antenna beam pattern, a plurality of identifiers for a plurality of transmit antenna beams or a plurality of identifiers for a plurality of receive antenna beams.

For example, the user node can receive information about which training signals will be sent on the second frequency band using which transmit beams. Therefore, the user node can determine which combination of transmit and receive beams yields the best link signal quality. The information about the plurality of training signals could be an ID that identifies the plurality of training signals, but the information could also comprise the training signals themselves.

In a fourth implementation of the access node according to the first aspect, the access node is configured to repeat sending the plurality of training signals until the access node receives a confirmation about a sufficient quality of communication or until a maximum number of trials has been reached.

This has the advantage that the determination of optimal beamforming parameters is automatically performed until a sufficient quality of communication is achieved or, if the maximum number of trials has been reached, it can no longer be expected that further iterations will improve the link quality.

In some embodiments of the invention, at least some of the above-described localizing functionality is outsourced to a controller that is external to the access node.

In a fifth implementation of the access node according to the first aspect, the first signal comprises a beacon signal and determining the first beamforming parameter comprises using received beacon signals by multiple access nodes.

The beacon signal can be a predetermined signal suitable for detection by one or more access nodes. The primary purpose of using radio beacons us using a known signal source to test and calibrate antennas and receivers.

Advantageously, this represents a particularly quick and efficient way for the access node to obtain a coarse estimate of where the user node is located.

A second aspect of the disclosure provides a user node for operating with one or more access nodes according to one of the previous claims, comprising:
 a first-band transmitter for sending at least one first signal on a first frequency band;
 a second-band receiver for receiving on a second frequency band at least one second signal; and
 a determination module for determining at least one second beamforming parameter based on the received second signal,
wherein the first frequency band comprises lower frequencies than the second frequency band.

In particular, the user node of the second aspect can be configured to communicate with the access node according to the first aspect or one of its implementations.

According to a first implementation of the user node of the second aspect, the user node is configured for establishing one receive antenna beam and for updating a direction of the one receive antenna beam in a sequential manner.

In this implementation, the user node is only operating one receive antenna beam at a time. This has the advantage that simpler hardware can be used. Thus, the user node has to operate the one receive antenna beam in a sequential manner. For example, different beam directions or other beam settings can be changed sequentially.

A third aspect of the disclosure provides a system comprising at least one access node according to the first aspect or one of its implementations and at least one user node according to the second aspect or one of its implementations, wherein the access node and/or the user node are configured such that the first signal on the first frequency band is transmitted simultaneously with the second signal on the second frequency band.

By using first and second frequency band simultaneously, the overall time for determining the first and/or the second beamforming parameter can be reduced.

A fourth aspect of the disclosure provides a method for determining at least one beamforming parameter for communication between an access node and a user node, comprising the steps:
 receiving, by a first-band receiver, at least one first signal from the user node on a first frequency band;
 determining at least one first beamforming parameter based on the received first signal; and
 sending, by a second-band transmitter, based on the determined first beamforming parameter on a second frequency band at least one second signal,
wherein the first frequency band comprises lower frequencies than the second frequency band.

The method of the fourth aspect can be carried out by the one or more access nodes of the first aspect. The second signal can be sent to the user node.

A fifth aspect of the present disclosure provides a method for determining at least one beamforming parameter for communication between a user node and one or more access nodes, comprising the steps:
 sending, by a first-band transmitter, at least one first signal on a first frequency band;
 receiving, by a second-band receiver, on a second frequency band at least one second signal; and
 determining at least one second beamforming parameter based on the received second signal,
wherein the first frequency band comprises lower frequencies than the second frequency band.

The method of the fifth aspect can be carried out by the user node of the second aspect. The first signal can be sent to the one or more access nodes.

In a first implementation of the method of the fifth aspect, the method further comprises a step of sending and/or receiving data using a transmit antenna beam that is configured based on the determined second beamforming parameter.

In a second implementation of the method of the fifth aspect, the method further comprises the steps:
 selecting a transmit antenna beam and/or a receive antenna beam; and
 sending on the first and/or the second frequency band an identifier of the selected transmit antenna beam and/or an identifier of the selected receive antenna beam to the one or more access nodes.

In a third implementation of the method of the fifth aspect, the method further comprises a step of opening a second-band receiver at a time point which is determined according to information about a plurality of training signals which has been received on the first frequency band.

In a fourth implementation of the method of the fifth aspect, the method further comprises a step of the user node calculating an availability of a link between the user node and the access node on the second frequency band, wherein preferably the prediction is based on availability data that is stored at the access node.

Storing availability data at the access node has the advantage that it is immediately available and can be used without first running an availability determination method.

A further aspect of the disclosure refers to a computer-readable storage medium storing program code, the program code comprising instructions for carrying out the method of the fourth or fifth aspect or one of the implementations of the fourth or fifth aspect.

BRIEF DESCRIPTION OF THE DRAWINGS

To illustrate the technical features of embodiments of the present disclosure more clearly, the accompanying drawings provided for describing the embodiments are introduced briefly in the following. The accompanying drawings in the following description are merely some embodiments of the present invention, modifications on these embodiments are possible without departing from the scope of the present disclosure as defined in the claims.

DETAILED DESCRIPTION OF THE EMBODIMENTS

Figure 1:
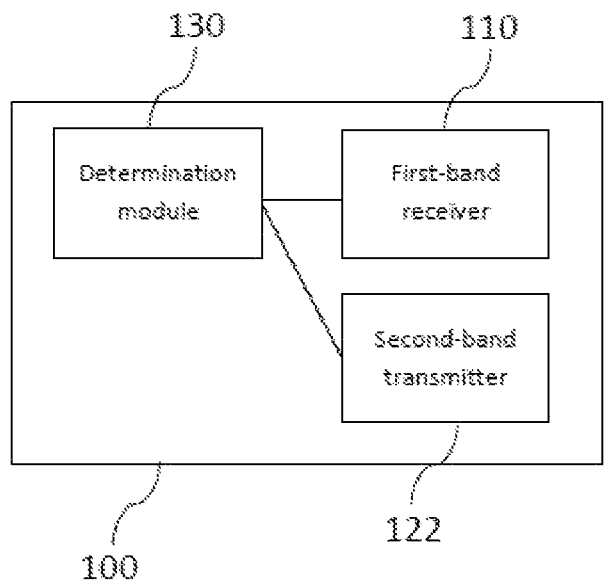
FIG. 1 a schematic illustration of an access node according to an embodiment of the invention, FIG. 2 a schematic illustration of a user node according to an embodiment of the invention, FIG. 3 a system comprising an access node and a user node according to further embodiments of the invention, FIG. 4 flow chart of a method for determining a beamforming parameter according to an embodiment of the invention, FIG. 5 flow chart of another method for determining a beamforming parameter according to a further embodiment of the invention, FIG. 6 a sequence diagram illustrating interaction between an access node and a user node in accordance with an embodiment of the invention, FIG. 7 another diagram illustrating interaction between an access node and a user node in accordance with another embodiment of the invention, and FIG. 8 a further flow chart of a method according to another embodiment of the invention.

FIG. 1 shows a schematic illustration of an access node 100 according to an embodiment of the invention. The access node 100 comprises a first-band receiver 110, a second-band transmitter 122 and a determination module 130. In the embodiment shown in FIG. 1, the determination module 130 is connected to the first-band receiver 110 and the second-band transmitter 122. In other embodiments, there can be other connections between the components of the access node 100.

Figure 2:
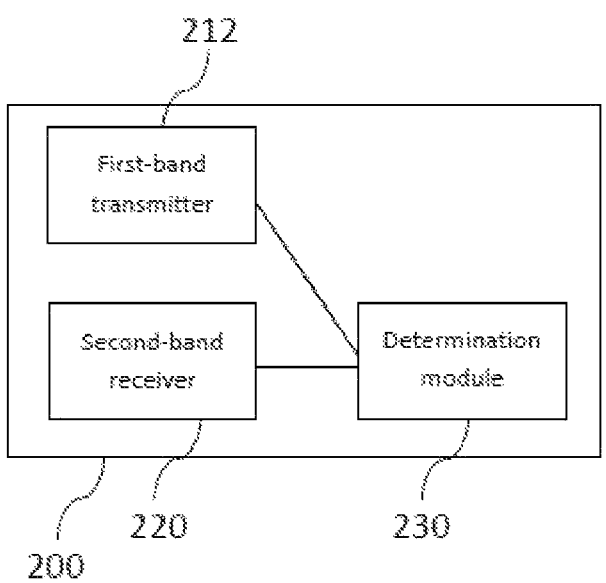

FIG. 2 shows a schematic illustration of a user node 200 according to an embodiment of the invention. The user node 200 comprises a first-band transmitter 212, a second-band transmitter 220, and a determination module 230. In the embodiment shown in FIG. 2, the determination module 230 of the user node 200 is connected to the first-band transmitter 212 and the second-band receiver 220. In other embodiments, there can be other connections between the components of the user node 200.

Figure 3:
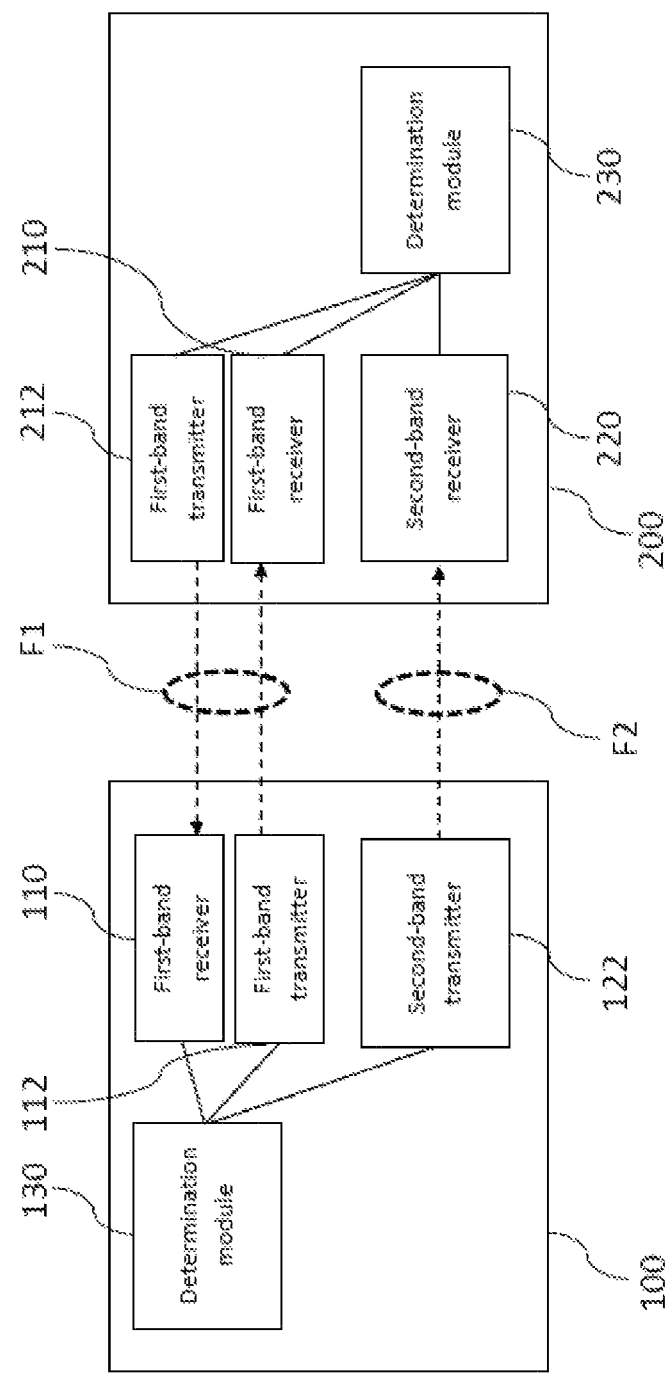

FIG. 3 shows a system 300 comprising an access node 100 and a user node 200 according to further embodiments of the invention. The access node 100 and the user node 200 communicate via a first frequency band F1 and a second frequency band F2. Compared to the embodiments shown in FIGS. 1 and 2, the access node 100 of FIG. 3 further comprises a first-band transmitter 112 and the user node 200 of FIG. 3 further comprises a first-band receiver 210.

In embodiments of the invention, the first frequency band is a cm wave band (C-band) and the second frequency band is a mm wave band (mmW-band). Thus, the system of FIG. 3 can use C-band localization together with mmW-band localization in order to notify the user node of the mmW band beamforming related parameters and reduce latencies needed for the optimal beam pairing.

The system of FIG. 3 can use mmW-band positioning results to optimize the positioning models and algorithms used for C-band positioning.

For periodical positioning on the first frequency band, the interval of the user node sending positioning beacons can be optimized according to positioning results obtained with the second frequency band.

The timing of the user node to open the second-band receiver can be controlled by the access node through signaling sent over the first frequency band link.

The signaling with the first frequency band can help with the second frequency band service discovery by informing second frequency band devices if the second-band service is available. Each second-band access point can be associated with an area where the service is available.

If the first frequency band based positioning detects that there are two or more second frequency band access nodes which are able to provide service to the same user node location those first frequency band access nodes (co-located with the second frequency band access nodes) can measure the uplink beacon signal. The network can select the best service second frequency band link based on these first frequency band measurements.

In at least one embodiment, the access node allocates uplink radio resource of the first frequency band and the user node sends out beacons using allocated radio resource. After the beacons are received by multiple access nodes, the location of the user node can be determined with above-mentioned localization algorithm and positioning models.

The localization results can then further be fine-tuned with the second frequency band link before data is transmitted with the second frequency band link when there is a strong enough path, e.g. a LOS path or near-LOS with single reflection path, available between the access node and the user node. First, the access node can command the user node to open the second-band receiver to detect the second frequency band transmission beams from the access node.

In at least one embodiment, the user node can use multiple second frequency band reception beams to test multiple transmission beams from the access node, or access nodes in case of involving multiple access nodes, and feedback the test results of the pairing of the best transmission beam and the reception beam back to the access node(s) through the first frequency band link. The direction of those user node reception beams for test purpose can be sent to the user node together with a "start to test the second frequency band link" signalling from the access node. The test results are used by the access node to start transmission with the second frequency band to the user node and also the test results are used by the access node to calibrate and optimize the positioning algorithm and models.

In at least one embodiment, the localization by the first frequency band link is done periodically such that when it is needed to localize the user node with the second frequency band link, there are always up-to-date localization results of the user node to be used by the access node. The interval of the localization by the first frequency band link can be optimized with results of the second frequency band localization, as part of the calibration of the positioning algorithm and models.

In at least one embodiment, the availability of the second frequency band link in the user node can be predicted by utilizing pre-determined second frequency band service availability area data stored in every access node. The second frequency band service availability area can be expressed for example with a polygon enclosing the receiver locations which can be served by the access node. The availability area can be pre-calculated with an appropriate prediction tool or it can be based on previously obtained and stored second frequency band signal strength measurements.

In the case of two or more second frequency band access nodes available in the location of the user node, the network can make the node selection by comparing the beacon signal measurements carried out by collocating first frequency band access nodes. In another embodiment, the access node can start localization with the first frequency band link just before the access node is to transmit an information packet to the user node on the second frequency band link.

Figure 4:
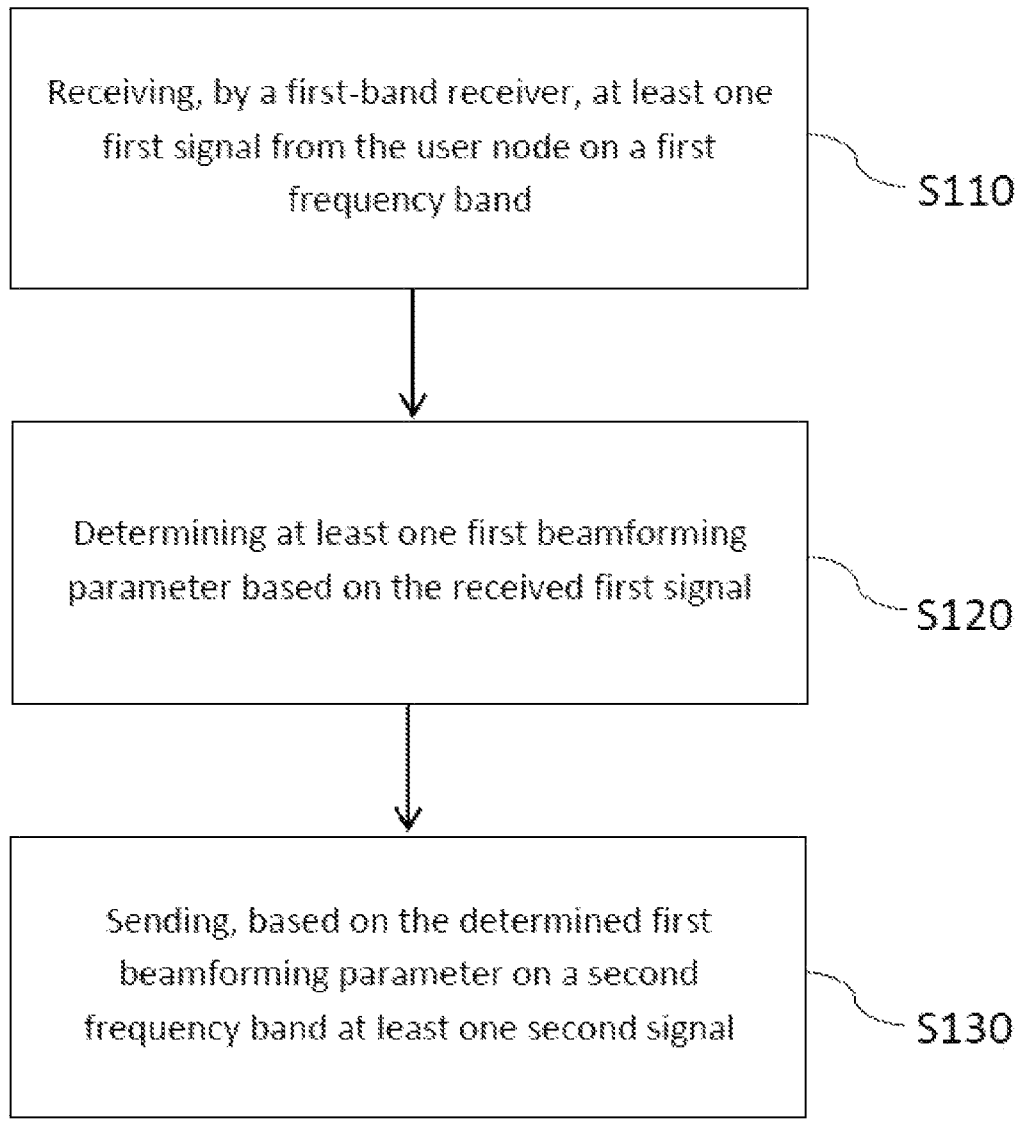

FIG. 4 is a flow chart of a first method according to an embodiment of the invention. The method can for example be carried out by an access node. The method can also be carried out by a plurality of access nodes which are connected to each other, e.g. via wired connections.

In a first step S110, a first-band receiver receives at least one first signal from the user node on a first frequency band. For example, the at least one first signal can be a beacon signal that is emitted from the user node in order to help the access node perform a coarse localization of the user node.

In a second step S120, at least one first beamforming parameter is determined based on the received first signal. For example, the access node can comprise a plurality of receive antennas, and the access node can be configured to compare the signals received at the plurality of receive antennas. Thus, the access node can estimate, in which direction relative to the antennas of the access node the user node is located. Therefore, step S120 can be seen as a coarse position determination step.

In a third step S130, a first-band transmitter sends, based on the determined first beamforming parameter on a second frequency band at least one second signal to the user node. Sending based on the determined first beamforming parameter means that at least one parameter of the components involved in the transmission is set based on the determined first beamforming parameter. For example, one or more transmission beams can be configured based on the first beamforming parameter. In particular, the at least one first beamforming parameter can comprise one or more transmission beam numbers for identifying one or more transmission beams. In this way, one or more transmission beams can be selected based on the at least one first beamforming parameter.

Figure 5:
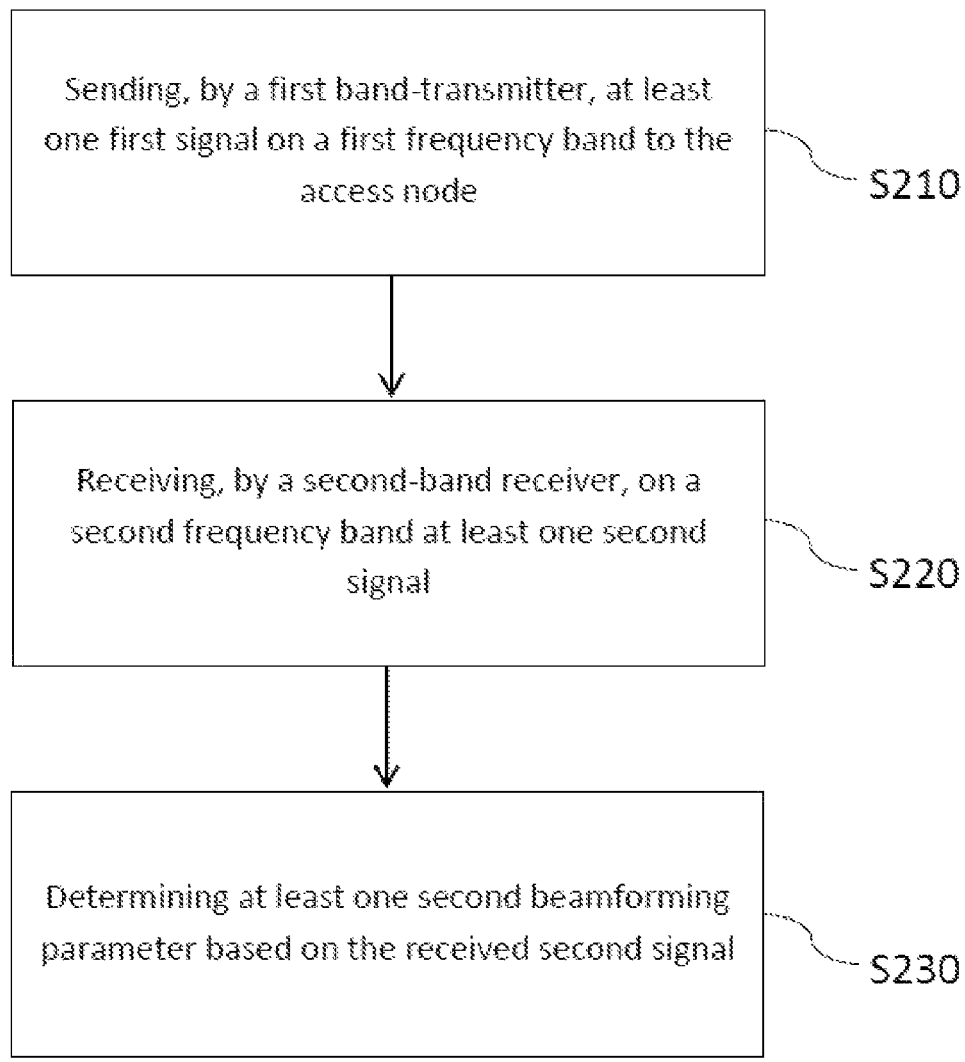

FIG. 5 is a flow chart of a second method in accordance with the invention. The second method can be carried out by a user node, e.g. by one of the user nodes 100 shown in FIG. 1 or FIG. 3.

In a first step S210, a first-band transmitter sends at least one first signal on a first frequency band (F1) to an access node, e.g. one of the access nodes 200 shown in FIG. 2 or FIG. 3. The first signal can be e.g. a beacon signal.

In a second step S220, a second-band receiver receives on a second frequency band F2 at least one second signal. The second signal can be e.g. a training signal.

In a third step S230, at least one second beamforming parameter is determined based on the received second signal.

Figure 6:
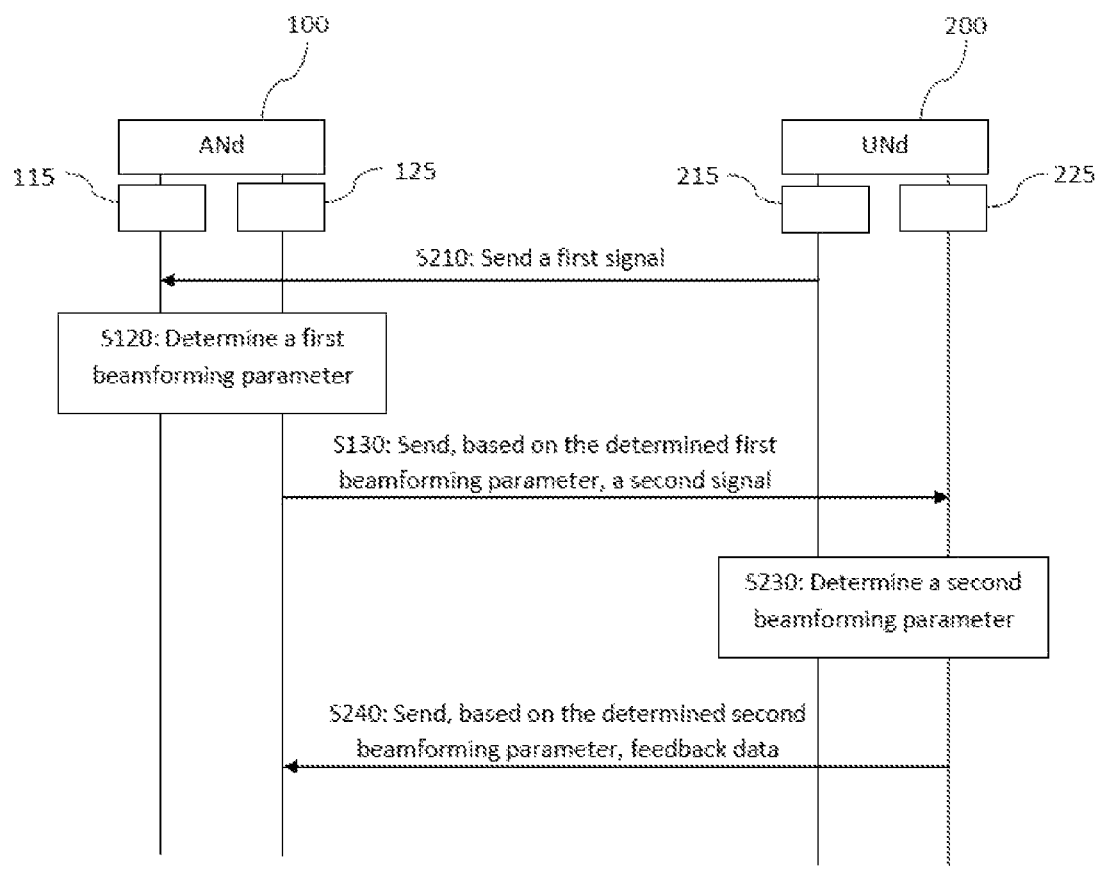

FIG. 6 is a sequence diagram illustrating an interaction between an access node and a user node in accordance with the present invention. In the embodiment shown in FIG. 6, an access node 100 comprises a first-band transceiver 115 for sending and receiving on a first frequency band and a second-band transceiver 125 for sending and receiving on a second frequency band. The user node 200 comprises a first-band transceiver 215 for sending and receiving on the first frequency band and a second-band transceiver 225 for sending and receiving on the second frequency band.

The interaction method illustrated in FIG. 6 begins with step S210, wherein the user node 200 sends a first signal, e.g. a beacon signal, to the access node 100. The access node 100 receives the first signal via the first-band transceiver 115. For example, the first signal from the user node 200 can be received using a plurality of receive antennas (not shown in FIG. 6) of the first-band transceiver 115. In this case, the access node can obtain a plurality of received first signals.

In step S120, the access node 100 determines a first beamforming parameter, e.g. by comparing signal strengths of the received first signals. The first beamforming parameter can be related to a location of the user node, i.e., the access node 100 can perform a coarse localization of the user node 200.

In step S130, the second-band transceiver 125 of the access node 100 sends, based on the determined first beamforming parameter, a second signal to the user node 200. For example, one or more transmission beams of the second-band transceiver 125 can be selected and/or configured based on the first beamforming parameter.

The second signal is received by the second-band transceiver 225 of the user node 200. In embodiments of the invention, the second-band transceiver 225 of the user node 200 comprises a plurality of receive antennas, and the second-band transceiver 225 obtains a plurality of received second signals via the plurality of receive antennas.

In step S230, the user node 200 determines a second beamforming parameter. The second beamforming parameter can be related to an orientation of the access node 100 relative to the user node 200.

In step S240, the second-band transceiver 225 of the user node 200 sends, based on the determined second beamforming parameter, feedback information about the best pair of transmit beam and receive beam.

Figure 7:
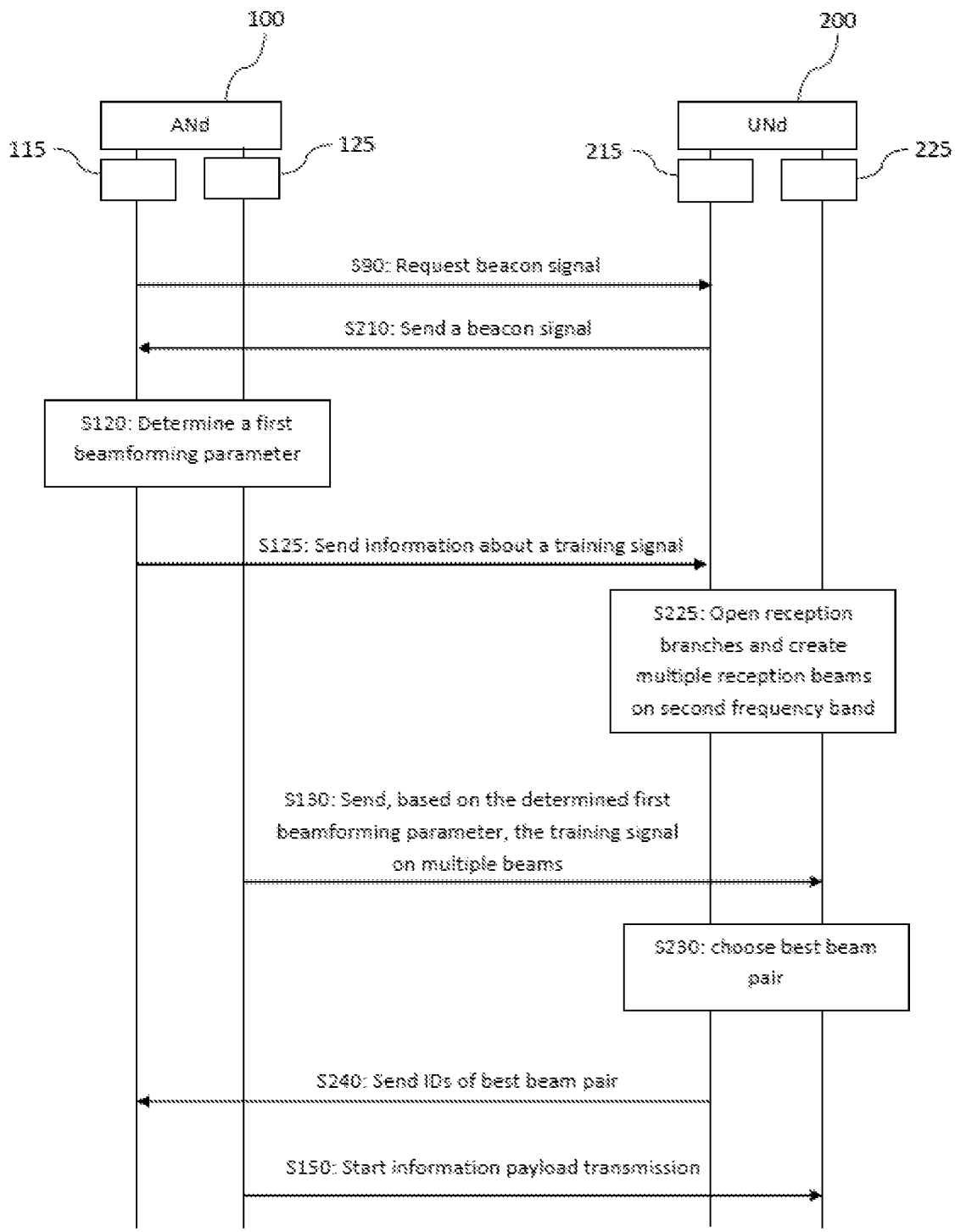

FIG. 7 is another diagram illustrating interaction between an access node and a user node in accordance with another embodiment of the invention.

The interaction method illustrated in FIG. 7 begins with step S90, wherein the access node requests a beacon signal from the user node 200, e.g. by sending a request signal using the first-band transceiver 115. The request signal can use a strong signal strength, since the access node 100 typically has higher transmit power than e.g. the user node 200.

In step S210, the first-band transceiver 215 of the user node 200 sends the requested beacon signal to the access node 100. In step S120, the access node 100 determines a first beamforming parameter.

In step S125, the access node 100 sends—using the first-band transceiver 115—information about a training signal to the user node 200.

In step S225, the user node opens reception branches and creates multiple reception beams on the second frequency band.

In step S130, which the access node 100 can perform e.g. after a predetermined time after step S125, the access node 100 sends, using the second-band transceiver 125, the training signal on multiple transmit beams. Which transmit beams the second-band transceiver uses and how these transmit beams are configured (e.g. signal strength or beam width) is determined based on the first beamforming parameter.

The user node 200 receives and evaluates the received training signals, e.g. by comparing the signals received on the second frequency band with different pairs of transmit and receive beams.

In step S230, the user node chooses a best beam pair, for example a pair of a transmit beam of the access node and a receive beam of the user node.

In step S240, the user node uses the first-band transceiver 215 to send feedback information, including for example IDs of the transmit beam and the receive beam of the best beam pair to the access node.

In step S150, the access node starts information payload transmission using the transmit beam ID that it has received from the user node. The user node uses the determined best receive beam to receive the payload transmission.

Figure 8:
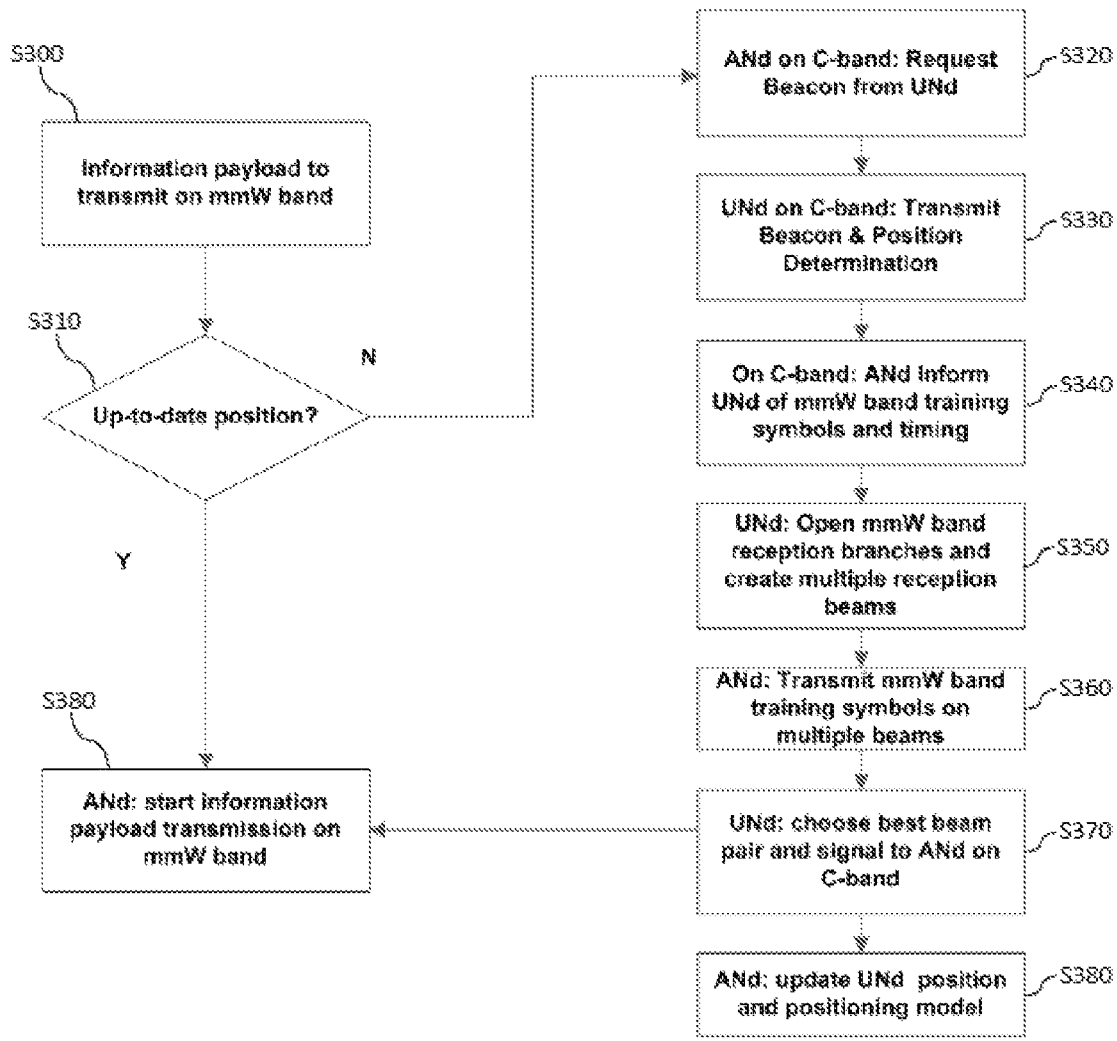

FIG. 8 is a further flow chart of a method according to another embodiment of the invention.

In step S300, an information payload to be transmitted on the mmW band is determined. In step S310, it is determined whether the system has an up-to-date position of the location of the user node. If it is determined that the system has an up-to-date position, the method continues with step S380, wherein the access node starts information payload transmission on the mmW band. If it is determined that the system does not have an up-to-date position, e.g. because the last determined position is older than a predetermined threshold, the method proceeds in step S320 with the access node requesting on the C-band a beacon from the user node.

In step S330, the user node transmits on the C-band a beacon signal, and a position determination is carried out. Subsequently, in step S340, the access node informs the user node on the C-band of the mmW band training symbols and their timing.

In step S350, the user node opens mmW band reception branches and creates multiple reception beams.

In step S360, the access node transmits mmW band training symbols on multiple beams.

In step S370, the user node chooses a best beam pair and signals an indication of the best beam pair on the C-band to the access node.

In step S380, the access node starts information payload transmission on the mmW band, based on the newly determined position. In step S390 (which can also be performed before step S380), the access node updates the user node position and the positioning model. This can involve updating transmission parameters.

The foregoing descriptions are only implementation manners of the present invention, the protection of the scope of the present disclosure is not limited to this. Any variations or replacements can be easily made through person skilled in the art. Therefore, the protection scope of the present disclosure should be subject to the protection scope of the attached claims.

Current communication networks often comprise multiple nodes of different types. The terminology "node" includes, but is not limited to a user terminal device, a base station, a relay station, or any other type of device capable of operating in a wireless or wire-line environment. When referred to in the above, the terminology "node" includes but is not limited to a base station, a Node-B or eNode-B, an access node, a base station controller, an aggregation point or any other type of interfacing device in a communication environment.

What is claimed is:

1. An access node configured for determining at least one beamforming parameter for communication between said access node and a user node, said access node comprising:
    a first-band receiver configured to receive at least one first signal from said user node on a first frequency band;
    a processor;
    a non-transitory computer-readable storage medium including computer-executable instructions executed by the processor to perform, on the access node, the instructions comprising:
        determining at least one first beamforming parameter based on said received first signal;
    a second-band transmitter configured to send, with a transmit beam that is configured based on said determined first beamforming parameter, on a second frequency band at least one second signal to said user node, wherein said at least one second signal comprises a plurality of training signals; and
    a first-band transmitter configured to send, on said first frequency band, an information about said plurality of training signals to said user node,
    wherein said first frequency band comprises lower frequencies than said second frequency band;
    wherein said access node is configured to repeat sending said plurality of training signals until said access node receives a confirmation about a sufficient quality of communication or until a maximum number of trials has been reached.

2. The access node of claim 1, wherein said first frequency band is in a centimeter wavelength range and said second frequency band is in a millimeter wavelength range.

3. The access node of claim 1, wherein said information about said plurality of training signals includes at least one of said plurality of training signals, a timing of said plurality of training signals, a transmit antenna beam pattern, a plurality of identifiers for a plurality of transmit antenna beams or a plurality of identifiers for a plurality of receive antenna beams.

4. The access node of claim 1, wherein said first signal comprises a beacon signal and determining said first beamforming parameter comprises using received beacon signals by multiple access nodes.

5. A user node for operating with one or more access nodes comprising:
    a first-band transmitter configured to send at least one first signal on a first frequency band;
    a second-band receiver configured to receive on a second frequency band at least one second signal;
    a processor; and
    a non-transitory computer-readable storage medium including computer-executable instructions executed by the processor to perform, on the user node, the instructions:
        determining at least one second beamforming parameter based on said received second signal,
    wherein said first frequency band comprises lower frequencies than said second frequency band;
    wherein said user node is configured for establishing one receive antenna beam at a time and for operating the one receive antenna beam in a sequential manner,
    wherein updating different beam directions or other beam settings of said one receive antenna beam in a sequential manner.

6. A system comprising:
    at least one access node; and
    at least one user node,
    wherein each access node in the at least one access node comprises:
        a first-band receiver configured to receive at least one first signal from said user node on a first frequency band,
        a first processor and a first non-transitory computer-readable storage medium including computer-executable instructions executed by the first processor to perform the step including determining at least one first beamforming parameter based on said received first signal,
        a second-band transmitter configured to send, with a transmit beam that is configured based on said determined first beamforming parameter, on a second frequency band at least one second signal to the at least one user node, wherein said at least one second signal comprises a plurality of training signals, and
        a first-band transmitter configured to send, on said first frequency band, an information about said plurality of training signals to said user node,
        wherein said access node is configured to repeat sending said plurality of training signals until said access node receives a confirmation about a sufficient quality of communication or until a maximum number of trials has been reached,
    wherein each user node in the at least one user node comprises:
        a first-band transmitter configured to send the at least one first signal on the first frequency band,
        a second-band receiver configured to receive on the second frequency band the at least one second signal, and
        a second processor and a second non-transitory computer-readable storage medium including computer-executable instructions executed by the second processor to perform the step including determining at least one second beamforming parameter based on the received at least one second signal, wherein said user node is configured for establishing one receive antenna beam at a time and for operating the one receive antenna beam in a sequential manner, wherein updating different beam directions or other beam settings of said one receive antenna beam in a sequential manner, wherein said first frequency band comprises lower frequencies than said second frequency band, and wherein each access node and each user node are configured such that the at least one first signal on said first frequency band is transmitted simultaneously with the at least one second signal on said second frequency band.

7. A method for determining at least one beamforming parameter for communication between an access node and a user node, comprising the steps:

receiving, by a first-band receiver, at least one first signal on a first frequency band;

determining at least one first beamforming parameter based on said received first signal;

sending, by a second-band transmitter, based on said determined first beamforming parameter on a second frequency band at least one second signal, wherein said at least one second signal comprises a plurality of training signals; and sending, by a first-band transmitter, on said first frequency band, an information about said plurality of training signals to said user node;

wherein said first frequency band comprises lower frequencies than said second frequency band;

wherein said access node is configured to repeat sending said plurality of training signals until said access node receives a confirmation about a sufficient quality of communication or until a maximum number of trials has been reached.

8. A method for determining at least one beamforming parameter for communication between a user node and one or more access nodes, comprising:

sending, by a first-band transmitter, at least one first signal on a first frequency band;

receiving, by a second-band receiver, on a second frequency band at least one second signal, and determining at least one second beamforming parameter based on said received second signal, wherein said first frequency band comprises lower frequencies than said second frequency band;

wherein said user node is configured for establishing one receive antenna beam at a time and for operating the one receive antenna beam in a sequential manner, wherein updating different beam directions or other beam settings of said one receive antenna beam in a sequential manner.

9. The method of claim 8, further comprising a step of sending and/or receiving data using a transmit antenna beam that is configured based on said determined second beamforming parameter.

10. The method of one of claim 8, further comprising the steps:

selecting a transmit antenna beam and/or a receive antenna beam; and sending on at least one of said first and said second frequency band an identifier of said selected transmit antenna beam and/or an identifier of said selected receive antenna beam to said one or more access nodes.

11. The method of one of claim 8, further comprising a step of opening a second-band receiver when an information about a plurality of training signals has been received on said first frequency band.

12. The method of claim 8, further comprising a step of said user node calculating an availability of a link between said user node and said one or more access node on said second frequency band, wherein a prediction is based on availability data that is stored at said one or more access nodes.

* * * * *